United States Patent
Fujii

(10) Patent No.: US 11,125,943 B2
(45) Date of Patent: Sep. 21, 2021

(54) OPTICAL MODULATOR AND OPTICAL MEASUREMENT APPARATUS

(71) Applicant: SUMITOMO ELECTRIC INDUSTRIES, LTD., Osaka (JP)

(72) Inventor: Kosuke Fujii, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 16/899,682

(22) Filed: Jun. 12, 2020

(65) Prior Publication Data

US 2021/0011216 A1  Jan. 14, 2021

(30) Foreign Application Priority Data

Jul. 9, 2019  (JP) .............................. JP2019-127628

(51) Int. Cl.
| | |
|---|---|
| *G02B 6/125* | (2006.01) |
| *G02F 1/025* | (2006.01) |
| *G02F 1/225* | (2006.01) |
| *G02B 6/12* | (2006.01) |
| *G02F 1/21* | (2006.01) |

(52) U.S. Cl.
CPC ............. *G02B 6/125* (2013.01); *G02F 1/025* (2013.01); *G02F 1/225* (2013.01); *G02B 2006/12083* (2013.01); *G02B 2006/12142* (2013.01); *G02F 1/212* (2021.01)

(58) Field of Classification Search
None
See application file for complete search history.

(56) References Cited

U.S. PATENT DOCUMENTS

| | | | | |
|---|---|---|---|---|
| 4,372,642 | A * | 2/1983 | Singer | ...................... G02F 1/125 385/130 |
| 2012/0207474 | A1* | 8/2012 | Inoue | ...................... H04B 10/60 398/65 |
| 2019/0011800 | A1* | 1/2019 | Kikuchi | .................. G02F 1/025 |
| 2020/0073057 | A1 | 3/2020 | Fujii | |
| 2020/0280171 | A1* | 9/2020 | Siriani | .................. H01S 5/2031 |
| 2021/0091529 | A1* | 3/2021 | Siriani | ................ H01L 31/0304 |

FOREIGN PATENT DOCUMENTS

| | | |
|---|---|---|
| JP | 2019-015791 A | 1/2019 |
| JP | 2020-034862 A | 3/2020 |

* cited by examiner

*Primary Examiner* — Chad H Smith
(74) *Attorney, Agent, or Firm* — Oliff PLC

(57) ABSTRACT

An optical modulator includes a substrate having a first face and a second face; an input port provided on the first face; a first waveguide provided on the substrate, the waveguide being connected to the input port; a first coupler provided on the substrate, the first coupler being optically connected to the first waveguide; an output port provided on the first face of the substrate, the output port being optically connected to the first coupler; and a first anti-reflection coating provided on the second face. The first face and the second face are arranged along a first direction. The first face and the second face extend in a direction intersecting the first direction. The first coupler extends in the first direction.

3 Claims, 4 Drawing Sheets

OPTICAL MODULATOR AND OPTICAL MEASUREMENT APPARATUS

CROSS-REFERENCE TO RELATED APPLICATION

This application is based upon and claims the benefit of priority of the prior Japanese Patent Application No. 2019-127628, filed on Jul. 9, 2019, the entire contents of which are incorporated herein by reference.

FIELD

The present invention relates to an optical modulator and an optical measurement apparatus.

BACKGROUND

Japanese Patent Application Publication No. 2019-15791 discloses an optical modulator. In an optical communication system of Quadrature Phase Shift Keying (QPSK) system, Mach-Zehnder type optical modulators are used for producing optical signals. The Mach-Zehnder type optical modulator has a waveguide, an input port and a plurality of output ports. For miniaturization of a size of the optical modulator, the waveguide is bended so as to arrange the input port and the output port on a same face.

SUMMARY

In order to evaluate characteristics of the optical modulator such as extinction characteristics, light is input to the optical modulator from an optical fiber, and an intensity of the light output from the optical modulator is measured. Stray light happens to be generated in the optical modulator. When the stray light is reflected back at an end facet of the optical modulator and is mixed with the light output from the output port, measurement accuracy is lowered. Therefore, an object is to provide an optical modulator and an optical measurement apparatus capable of suppressing the reflection of stray light.

An optical modulator according to the present disclosure includes a substrate having a first face and a second face; an input port provided on the first face; a first waveguide provided on the substrate, the waveguide being connected to the input port; a first coupler provided on the substrate, the first coupler being optically connected to the first waveguide; an output port provided on the first face of the substrate, the output port being optically connected to the first coupler; and a first anti-reflection coating provided on the second face. The first face and the second face are arranged along a first direction. The first face and the second face extend in a direction intersecting the first direction. The first coupler extends in the first direction.

An optical measurement apparatus according to the present disclosure includes the optical modulator described above; an optical fiber array including a support, a single-mode optical fiber, and a multi-mode optical fiber; a light source; and a detector. The single-mode optical fiber and the multi-mode optical fiber are arranged on the support. The multi-mode optical fiber has a core diameter greater than that of the single-mode optical fiber. The multi-mode optical fiber has an end face opposed to the first face of the optical modulator.

DESCRIPTION OF EMBODIMENTS

Figure 1:
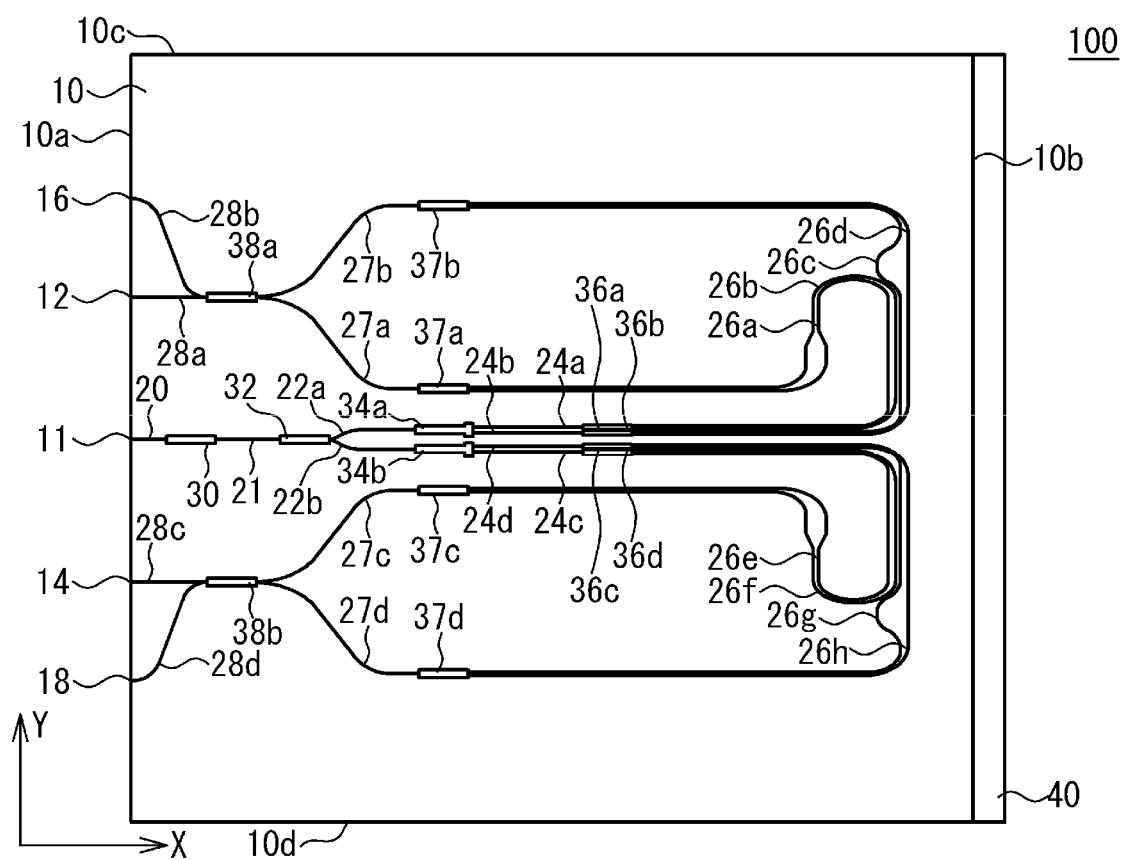
FIG. 1 is a plan view illustrating an optical modulator according to an embodiment.

Some embodiments will now be described. (1) An embodiment of the present disclosure is an optical modulator including a substrate having a first face and a second face; an input port provided on the first face; a first waveguide provided on the substrate, the waveguide being connected to the input port; a first coupler provided on the substrate, the first coupler being optically connected to the first waveguide; an output port provided on the first face of the substrate, the output port being optically connected to the first coupler; and a first anti-reflection coating provided on the second face. The first face and the second face are arranged along a first direction. The first face and the second face extend in a direction intersecting the first direction. The first coupler extends in the first direction. The first anti-reflection coating passes through a stray light generated in the coupler, and thus the stray light does not get mixed with an output light at the first face.

(2) According to an embodiment of the present disclosure, the first and second faces of the optical modulator may be opposed to each other. As the first anti-reflection film is provided on the second face, the stray light is hardly reflected back toward the first face even though the faces are opposed to each other.

(3) According to an embodiment of the present disclosure, the optical modulator may include a Mach-Zehnder type optical modulator including a second coupler and a pair of second waveguides. The Mach-Zehnder type optical modulator may be optically connected between the input port and the output port. The second coupler may extend in the first direction. The reflection of stray light generated from the second coupler can be suppressed by the first anti-reflection coating.

(4) According to an embodiment of the present disclosure, the second waveguide may include a pair of straight portions and a curved portion. The straight portions may extend in the first direction. The curved portion optically connects the straight portions. By providing the first anti-reflection film on the second face, reflection of stray light from the coupler can be effectively suppressed.

(5) According to an embodiment of the present disclosure, the optical modulator may include a second anti reflection coating provided on a third face of the substrate, the third face extending in the first direction. Reflection of stray light can be suppressed more effectively.

(6) An embodiment of the present disclosure includes an optical measurement apparatus including the optical modulator described above; an optical fiber array including a support, a single-mode optical fiber, and a multi-mode optical fiber; a light source; and a detector. The single-mode optical fiber and the multi-mode optical fiber are arranged on the support. The multi-mode optical fiber has a core diameter greater than that of the single-mode optical fiber. The multi-mode optical fiber has an end face opposed to the first face of the optical modulator. By suppressing the reflection of stray light by the anti-reflection film of the optical modulator, it is possible to reduce the intensity of stray light propagating into the multi-mode optical fiber. Therefore, the measurement accuracy of the characteristics of the optical modulator is improved.

(7) According to an embodiment of the present disclosure, the core diameter of the multi-mode optical fiber may be larger than 50 μm and less than 600 μm. By suppressing the reflection of stray light by the anti-reflection film of the optical modulator, it is possible to reduce the intensity of stray light propagating into the multi-mode optical fiber.

(8) According to an embodiment of the present disclosure, the end face of the multi-mode optical fiber is arranged apart from the first face of the optical modulator with a distance of 50 μm or more, and 0.5 mm or less.

Specific examples of an optical modulator and an optical measurement apparatus according to the present disclosure will be described below with reference to the drawings. It should be noted that the present disclosure is not limited to these examples, but is indicated by the claims, and it is intended to include all modifications within the meaning and range equivalent to the claims.

First Embodiment (Optical modulator) FIG. 1 is a plan view illustrating an optical modulator 100 according to a first embodiment. The optical modulator 100 includes a Mach-Zehnder type modulator formed of a GaAs based semiconductor or an InP-based semiconductor, for example. The optical modulator 100 includes a substrate 10, an input port 11, output ports 12, 14, 16, 18, a plurality of waveguides, a plurality of couplers, and an anti-reflection coating 40 (first anti-reflection coating).

The substrate 10 is a semiconductor substrate formed of a compound semiconductor such as a GaAs or InP. The substrate 10 is rectangular and has four faces 10a to 10d. The face 10a (first face) and the face 10b (second face) extend in the Y-axis direction, and are arranged apart from each other in the X-axis direction (first direction). The face 10a and the face 10b are opposed to each other. The face 10c and the face 10d extend in the X-axis direction, and are arranged apart from each other in the Y-axis direction. Each length of the faces 10a and 10b is, for example, 8 mm to 9 mm, and each length of the faces 10c and 10d is, for example, 10 mm to 12 mm.

The face 10a is provided with the input port 11 and output ports 12, 14, 16 and 18. On the face 10a, the output port 18, the output port 14, the input port 11, the output port 12 and the output port 16 are arranged in this order. The face 10b is provided with the anti-reflection coating 40. The anti-reflection coating 40 is formed of, for example, 0.22 μm thick aluminum oxide ($Al_2O_3$) or the like, to suppress reflections of light scope from 1.53 μm to 1.57 μm wavelengths. The face 10a is also provided with an anti-reflection coating (not shown).

A plurality of waveguides and a plurality of couplers are provided on the substrate 10. Each waveguide includes a plurality of cladding layers and a core layer sandwiched between the cladding layers. A coupler 30 (first coupler) is a one-input-one-output Multi-Mode Interferometer (MMI) coupler. Couplers 32, 34a, 34b, 36a to 36d are MMI couplers of one input and two outputs. Couplers 37a to 37d are MMI couplers with two inputs and one output. Couplers 38a and 38b are two-input-two-output MMI couplers. The couplers extend in the X-axis direction, directed from the face 10a side to the face 10b side, or from the face 10b to the face 10a.

A waveguides 20 (first waveguide) is optically connected to the input port 11, and optically connected to the coupler 30. The waveguide 20 extends in the X-axis direction. Waveguides 21, 24a to 24c extend in the X-axis direction. Waveguides 26a to 26h include straight portions extending in the X-axis direction from the face 10a side to the face 10b side, curved portions in a vicinity of the face 10b, and another straight portions extending from the face 10b side to the face 10a side. Waveguides 27a to 27d, 28b and 28d bend and extend towards the face 10a.

One end of the waveguide 20 is coupled to the input port 11 and the other end is coupled to one end of the coupler 30. The waveguide 21 is coupled to the other end of the coupler 30 and to one end of the coupler 32. The other ends of the coupler 32 are coupled to one end of the waveguides 22a and 22b.

Other end of the waveguide 22a is coupled to one end of the coupler 34a, and other end of the coupler 34a is coupled to one ends of the waveguides 24a and 24b. Other end of the waveguide 24a is coupled to one end of the coupler 36a (second coupler), and other end of the coupler 36a is coupled to one ends of the waveguides 26a and 26b (second waveguides). Other ends of the waveguides 26a and 26b are coupled to one end of the coupler 37a, and other end of the coupler 37a is coupled to one end of the waveguide 27a. The couplers 36a, 37a and the waveguides 26a, 26b form a Mach-Zehnder type optical modulator. Other end of the waveguide 24b is coupled to one end of the coupler 36b, and other end of the coupler 36b is coupled to one ends of the waveguides 26c and 26d. Other ends of the waveguides 26c and 26d are coupled to one end of the coupler 37b, and other end of the coupler 37b is coupled to one end of the waveguide 27b. The couplers 36b, 37b and the waveguides 26c, 26d form another Mach-Zehnder type optical modulator. Other ends of waveguides 27a and 27b are coupled to one end of coupler 38a, and other end of coupler 38a is coupled to one end of waveguides 28a and 28b. Other end of the waveguide 28a is coupled to the output port 12 and other end of the waveguide 28b is coupled to the output port 16.

The waveguides 22b, 24c, 24d, the waveguides 26e to 26h, the waveguides 27c, 27d, the waveguides 28c and 28d, the couplers 34b, 36c, 36d, 37c, 37d and 38b are coupled in a similar manner to the above-described configuration. The waveguide 28c is coupled to the output port 14 and the waveguide 28d is coupled to the output port 18.

Light incident from the input port 11 propagates through the waveguide 20, the coupler 30, the waveguide 21, and is branched into the waveguides 22a and 22b in the coupler 32. The light propagating through the waveguide 22a is branched into the waveguides 24a and 24b at the coupler 34a, further branched into the waveguides 26a and 26b at the coupler 36a, and branched into the waveguides 26c and 26d at the coupler 36b. The lights propagating through the waveguides 26a and 26b are multiplexed in the coupler 37a and propagates through the waveguide 27a. The lights propagating through the waveguides 26c and 26d are multiplexed in the coupler 37b and propagates through the waveguide 27b. The lights propagating through the waveguides 27a and 27b are merged at the coupler 38a. A portion of the merged light is emitted from the output port 12 through the waveguide 28a, and other portion is emitted from the output port 16 through the waveguide 28b.

The light propagating through the waveguide 22b is similarly branched and multiplexed and emitted from the output ports 14 and 18. By applying a voltage to the electrodes (not illustrated) of the optical modulator 100, the light propagating through the optical modulator 100 is modulated with, for example, QPSK.

Figure 2:
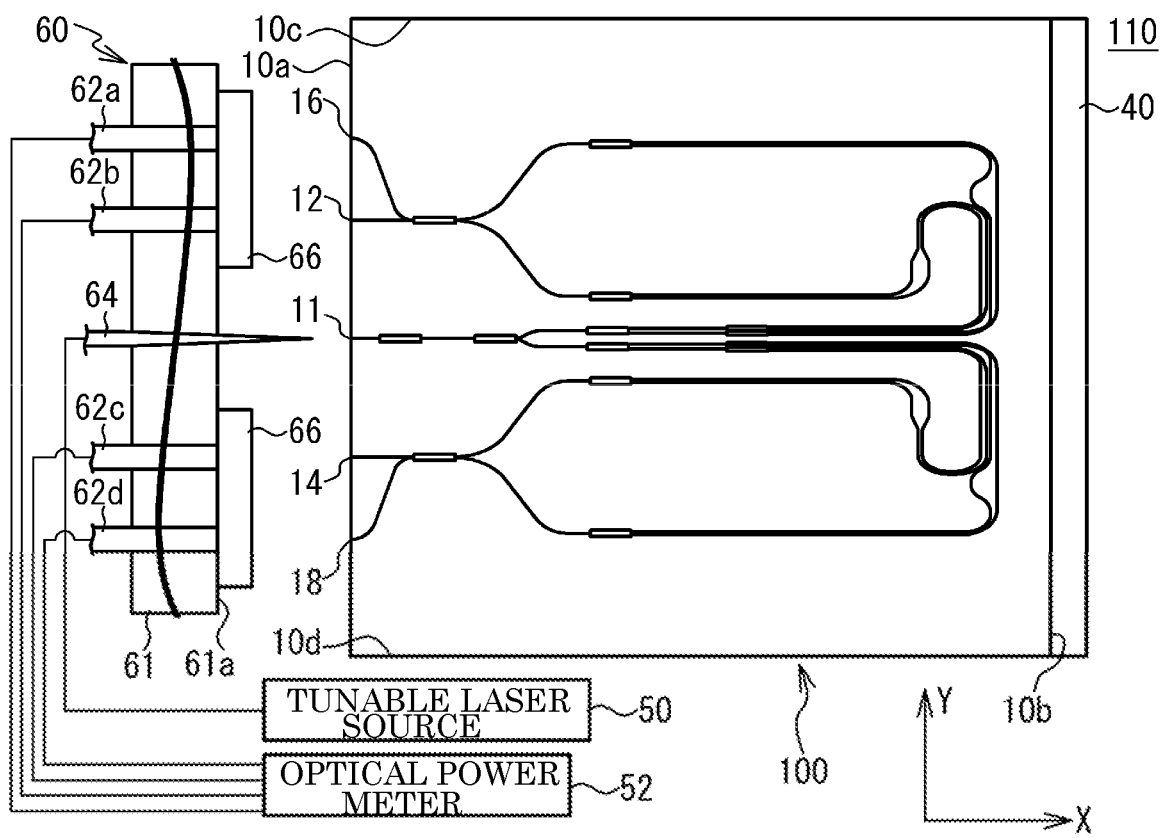
FIG. 2 is a plan view illustrating an optical measurement apparatus.

(Optical Measurement Apparatus) FIG. 2 illustrates an optical measurement apparatus 110. The optical measurement apparatus 110 is used to measure characteristics of the optical modulator 100. The optical measurement apparatus 110 includes, for example, a tunable laser source 50 for light source, an optical power meter 52 for light detection, and an optical fiber array 60.

The optical fiber array 60 has a base plate 61 (support), and a plurality of optical fibers 62a to 62d and 64. The optical fibers are disposed in grooves formed on an upper surface of the base plate 61. The optical fiber 64 is arranged near a center of the base plate 61. The optical fibers 62a and 62b are disposed on one side of the optical fiber 64, and the optical fibers 62c and 62d are disposed on the other side of the optical fiber 64. The optical fibers 62a to 62d and 64 extend in the X-axis direction.

The four optical fibers 62a to 62d are multimode optical fibers (MMFs). The optical fiber 64 is a single mode optical fiber (SMF) having a polarization maintaining characteristic. A tip of the optical fiber 64 is processed into a lens with a convex shape. A core diameter of each of the optical fibers 62a to 62d is larger than a core diameter of the optical fiber 64. The core diameters of the optical fibers 62a to 62d are, for example, 400 µm. The core diameters of the optical fibers 62a to 62d are preferably larger than 50 µm and less than 600 µm. The core diameter of the optical fiber 64 is, for example, 8 µm. The outer diameter of a glass portion of the optical fiber 64 is 125 µm.

A face 61a of the base plate 61 of the optical fiber array 60 faces the optical modulator 100. A distance between the face 61a and the face 10a of the optical modulator 100 is, for example, 0.4 mm. The distance between the face 61a and the face 10a is preferably 50 µm or more, and 0.5 mm or less.

End faces of the optical fibers 62a to 62d are located in a same plane as the face 61a. Two polarizing plates 66 are attached to the face 61a. One of the polarizing plates 66 covers the end faces of the optical fibers 62a and 62b, and the other of the polarizing plates 66 covers the end faces of the optical fibers 62c and 62d. A thickness of the polarizing plate 66 is, for example, 0.2 mm, and may be 100 µm or more and 400 µm or less. On the other hand, an end face of the optical fiber 64 is not covered by the polarizing plate 66. The end face of the optical fiber 64 protrudes toward the optical modulator 100 from the face 61a.

The tunable laser source 50 outputs a laser light into the optical fiber 64. The laser light is incident from the optical fiber 64 to the input port 11 of the optical modulator 100. The laser light is modulated in the optical modulator 100, and is emitted from the output ports 12, 14, 16 and 18. Each light emitted from the output ports 12, 14, 16 and 18 is incident to the respective optical fibers 62a to 62d through the polarizing plates 66. The polarizing plate 66 passes the light having a predetermined polarization, for example, TE polarization. The optical power meter 52 measures the intensity of lights incident from the optical fibers 62a to 62d.

The optical measurement apparatus 110 evaluates, for example, extinction characteristics of the Mach-Zehnder type optical modulators included in the optical modulator 100. In the evaluation of the extinction characteristics, a faint light from the output ports are to be detected, since an intensity of the light is lowered when the Mach-Zehnder type optical modulator is at an extinction state. The extinction state is achieved by applying a voltage to the waveguides of the optical modulator 100. For improvement of measurement accuracies, it is preferable that lights other than the light from the output ports 12, 14, 16, 18 are not optically coupled to the optical fibers 62a to 62d.

Light happens to generate higher-order modes when the light passing through the coupler could not be coupled to the waveguides. The higher-order modes are spread as stray lights into areas of the optical modulator 100 outside the waveguides. The faces 10a to 10d are formed by cleaving a wafer of InP or GaAs. The faces made by cleaving easily reflect light. The stray light is reflected by the faces and may be emitted from in a vicinity of the exit port. Since the optical fibers 62a to 62d have large core diameters, the stray light is easy to incident to the optical fibers 62a to 62d. When the stray light is incident into the optical fibers 62a to 62d, the accuracy of the measurement is lowered. Since the optical fibers 62a to 62d facing the exit port are MMFs each having a large diameter, it is easy to receive stray light as compared with the SMF having a small core diameter.

Stray light is likely to occur in the coupler of the optical modulator 100. In the optical modulator 100, light has the largest intensity in the vicinity of the input port 11. Away from the input port 11, and the intensity of the light attenuates as it branches. Therefore, the coupler 30 which is the closest to the input port 11 may generate the stray light with high intensity. Thus, the measurement accuracy is sensitive to the stray light from the coupler 30.

According to the first embodiment, the input port 11 and the output ports 12, 14, 16, and 18 are provided on the face 10a of the substrate 10, and the anti-reflection coating 40 is provided on the opposite face 10b. The couplers extend from the face 10a side to the face 10b side, and the stray light is emitted from the coupler. The light input from the input port is propagating in the X-axis direction, and is incident on the couplers 30, 32, 34a and 34b. The stray lights are emitted toward the face 10b. In addition, the stray lights may propagate toward the face 10c, and may be reflected by the face 10c toward the face 10b. The anti-reflection coating 40 provided on the face 10b passes through the stray lights toward outside of the optical modulator 100. The anti-reflection coating 40 prevents such stray lights reflected back toward the face 10a. Therefore, the stray lights are hard to output from the face 10a. The stray lights are not optically coupled to the output ports. The light output from the output ports are not contaminated by the stray lights. The optical fiber array 60 is hard to receive the stray lights. As a result, the measurement accuracy of the characteristics such as extinction characteristics is improved.

Figure 3:
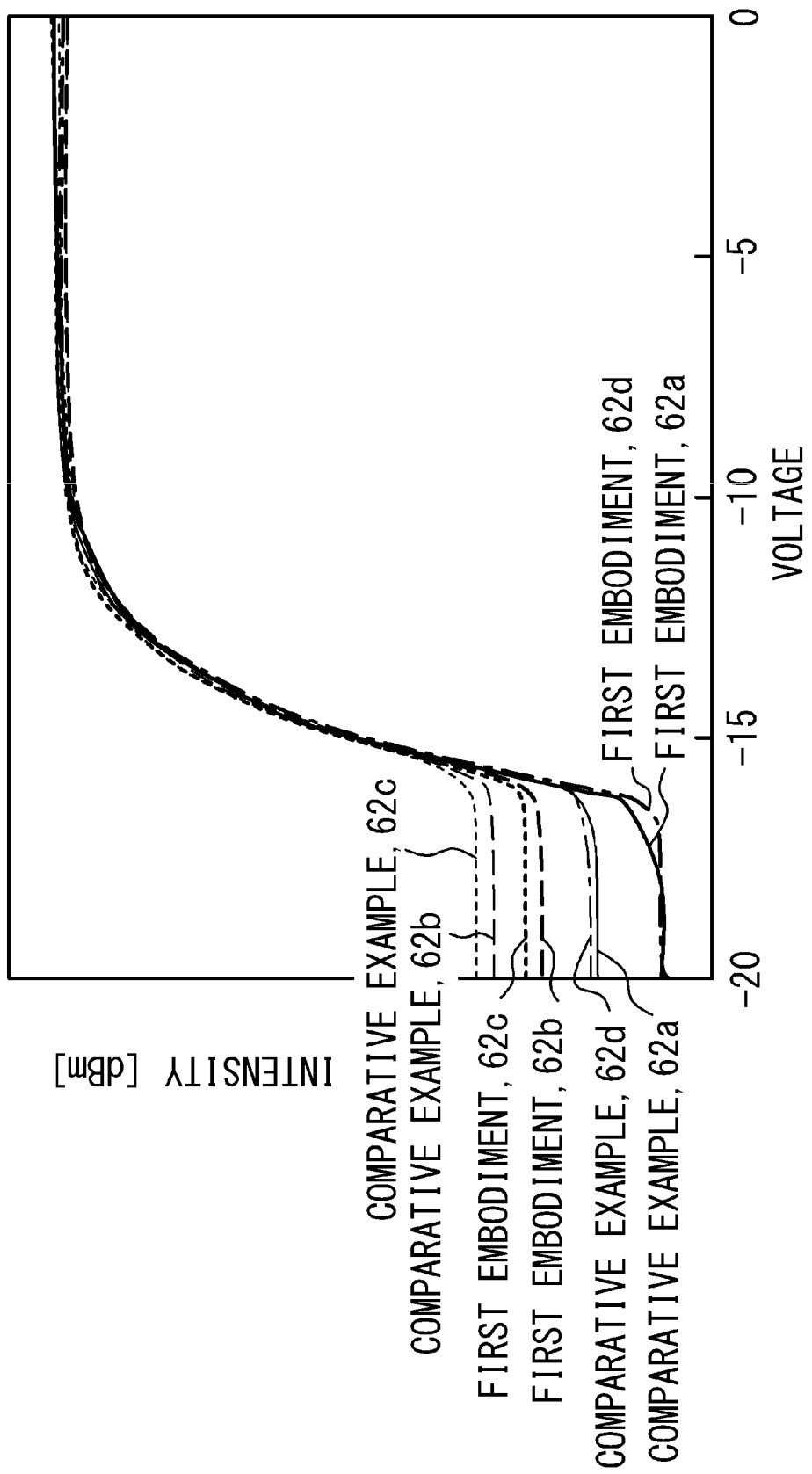
FIG. 3 is a graph illustrating extinction characteristics.

FIG. 3 is a graph illustrating extinction characteristics. The horizontal axis represents a voltage applied to the optical modulator 100, and the vertical axis represents the intensity of the light the optical fiber array 60 receives. Lines designated with "comparative example" are extinction characteristics in which the anti-reflection coating 40 is not provided on the face 10b of the optical modulator. Thin lines correspond to a comparative example, and thick lines correspond to the first embodiment. In each example, the solid lines correspond to the intensities of lights received by the optical fiber 62a, dashed lines correspond to intensities of lights received by the optical fiber 62b, dotted lines correspond to intensities of lights received by the optical fiber 62c, and dash-dot lines correspond to intensities of lights received by the optical fiber 62d.

As illustrated in FIG. 3, the intensity of light received by the optical fiber is lowered as increasing the absolute value of the voltage. The light is absorbed by the waveguide as the voltage applied to the waveguide increases. When compared for each optical fiber, the intensities of the first embodiment are smaller than those of the comparative example. This is because the reflection of stray light can be suppressed by the anti-reflection coating 40 according to the first embodiment.

Among the plurality of the couplers, the coupler closest to the input port 11 of the optical modulator 100 generates the stray light having the strongest intensity. For example, the coupler 30 initially receives the input light from the input port 11, and may generate the stray light with stronger intensity than stray lights from other couplers. As the coupler 30 extends from the face 10a side to the face 10b side, the strong stray light propagates toward the face 10b. By providing the anti-reflection coating 40 on the face 10b, a back reflection of the stray light toward the face 10a can be effectively suppressed.

The couplers other than the coupler 30 also extend from the face 10a side to the face 10b side. The reflections of stray lights generated from these couplers can also be suppressed by the anti-reflection coating 40.

The input port 11 and the output ports are provided on the face 10a. The couplers 30, 32, 34a, and 34b pass through lights traveling in a direction from the face 10a toward the face 10b. Thus, stray lights may travel in the direction toward the face 10b. By providing the anti-reflection coating 40 on the face 10b facing the face 10a, back reflection of stray lights toward the face 10a can be effectively suppressed. Thus, the cores of the optical fibers 62a, 62b, 62c, and 62d hard to receive stray lights. The couplers 37a to 37d, the couplers 38a and 38b pass through lights traveling in a direction from the face 10b toward the face 10a. Stray lights generated in the couplers may propagate backwardly toward the face 10b. Alternatively, the stray lights may propagates toward the faces 10c, 10d. These stray lights repeat reflection at the faces and may be directed to the output ports. The reflections of stray lights are suppressed by the anti-reflection coating 40.

The couplers are optically coupled to the waveguides and extend in the direction along which the waveguides extend. The coupler may be arranged so that the coupler extends in a direction other than the X-axis direction, such as the Y-axis direction. The reflection of stray light generated from such a coupler can be suppressed by the anti-reflection coating 40. It is effective to provide the anti-reflection coating 40 on the face intersecting the extending direction of the coupler. That is, the anti-reflection coating 40 is provided on at least one of the faces 10b, 10c, and 10d in accordance with the extending direction of the coupler. The number and the arrangement of the couplers may be modified from the example of FIG. 1.

The optical fiber array 60 illustrated in FIG. 2 has the optical fibers 62a to 62d. The faces of the optical fibers 62a to 62d are opposed to the output ports of the optical modulator 100. The optical fibers 62a to 62d have cores with large diameters. When the stray lights are emitted from the face 10a in a vicinity of the output ports, the optical fibers 62a to 62d may receive the stray lights. By providing the anti-reflection coating 40 to the face 10b of the optical modulator 100, the back reflection of the stray lights toward the face 10a is suppressed. It is possible to reduce stray lights received by the optical fibers 62a to 62d. As a result, the measurement accuracy of the characteristics of the optical modulator 100 such as extinction characteristics is improved.

Second Embodiment

Figure 4:
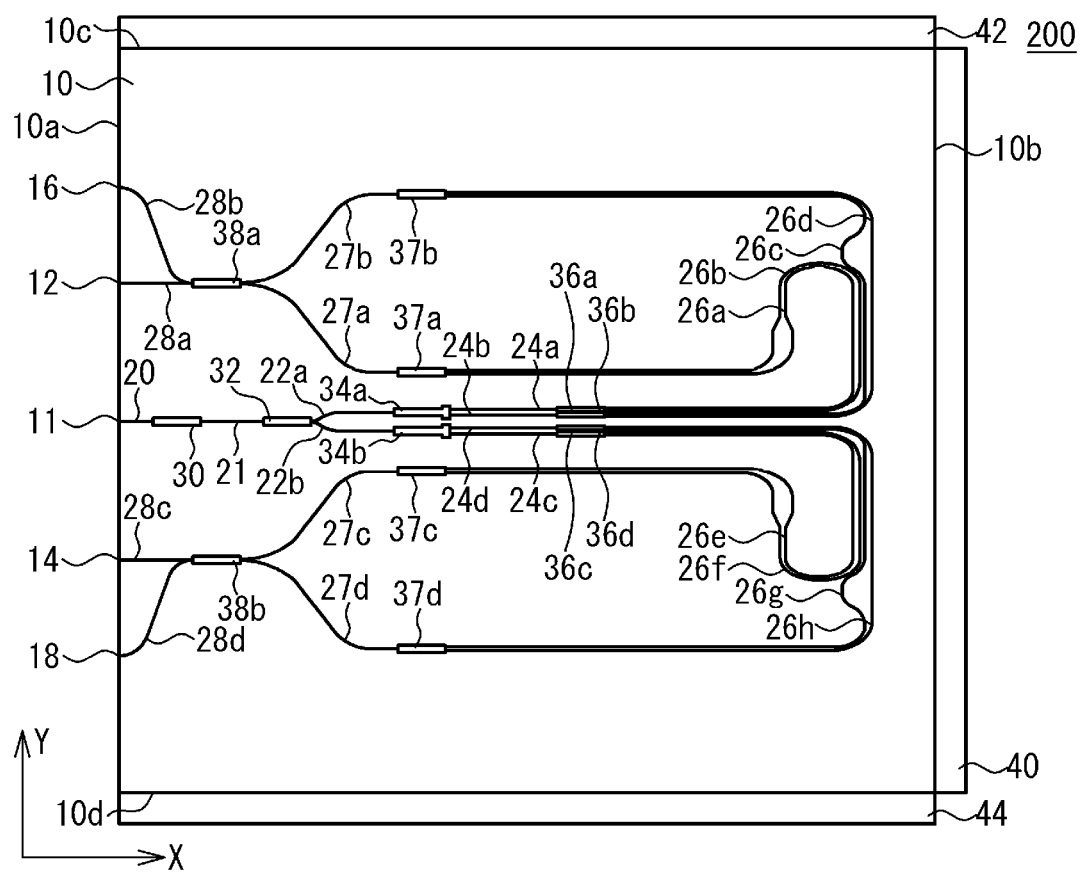
FIG. 4 is a plan view illustrating the optical modulator according to an embodiment.

FIG. 4 is a plan view illustrating the optical modulator 200 according to the second embodiment. An anti-reflection coating 42 (second anti-reflection coating) is provided on the face 10c of the substrate 10 (second face), and an anti-reflection coating 44 (second anti-reflection coating) is provided on the face 10d (second face). The other constitutions are the same as those of the first embodiment.

According to the second embodiment, by providing the anti-reflection coatings on the three faces, reflection of stray light from the faces 10b to 10d can be suppressed more effectively. The anti-reflection coating may be provided on one of the faces 10c and 10d. In order to suppress reflection of stray light, it is preferable to provide an anti-reflection coating on every face surrounding the substrate 10.

What is claimed is:

1. An optical measurement apparatus comprising:
   an optical modulator including:
   a substrate having a first face and a second face, the first face and the second face are arranged along a first direction, the first face and the second face extend in a direction intersecting the first direction,
   an input port provided on the first face,
   a first waveguide provided on the substrate, the first waveguide being connected to the input port,
   a first coupler provided on the substrate and extending in the first direction, the first coupler being optically connected to the first waveguide,
   an output port provided on the first face of the substrate, the output port being optically connected to the first coupler, and
   a first anti-reflection coating provided on the second face;
   an optical fiber array including a support, a single-mode optical fiber, and a multi-mode optical fiber, the single-mode optical fiber and the multi-mode optical fiber being arranged on the support, the multi-mode optical fiber having a core diameter greater than a core diameter of the single-mode optical fiber, and the multi-mode optical fiber has an end face opposed to the first face of the optical modulator;
   a light source; and
   a detector.

2. The optical measurement apparatus according to claim 1, wherein the core diameter of the multi-mode optical fiber is larger than 50 µm and less than 600 µm.

3. The optical measurement apparatus according to claim 1, wherein the end face of the multi-mode optical fiber is arranged apart from the first face of the optical modulator with a distance of 50 µm or more, and 0.5 mm or less.

* * * * *